US009007900B2

(12) United States Patent
Collings et al.

(10) Patent No.: US 9,007,900 B2
(45) Date of Patent: Apr. 14, 2015

(54) DYNAMIC FREQUENCY ALLOCATION IN WIRELESS BACKHAUL NETWORKS

(75) Inventors: Iain Bruce Collings, Roseville Chase (AU); Wei Ni, Marsfield (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 148 days.

(21) Appl. No.: 13/516,108

(22) PCT Filed: Jun. 30, 2011

(86) PCT No.: PCT/AU2011/000817
§ 371 (c)(1), (2), (4) Date: Aug. 10, 2012

(87) PCT Pub. No.: WO2012/000046
PCT Pub. Date: Jan. 5, 2012

(65) Prior Publication Data

US 2012/0307633 A1 Dec. 6, 2012

Related U.S. Application Data

(60) Provisional application No. 61/362,257, filed on Jul. 7, 2010.

(30) Foreign Application Priority Data

Jun. 30, 2010 (AU) ................................ 2010902912

(51) Int. Cl.
*H04J 1/16* (2006.01)
*H04W 72/04* (2009.01)
(Continued)

(52) U.S. Cl.
CPC .......... *H04W 72/0486* (2013.01); *H04W 28/16* (2013.01); *H04W 72/0453* (2013.01); *H04W 72/082* (2013.01)

(58) Field of Classification Search
USPC ......... 370/206, 216, 230, 252, 315, 328, 329, 370/336
See application file for complete search history.

(56) References Cited

U.S. PATENT DOCUMENTS 5,265,262 A * 11/1993 Grube et al. .................... 455/17
5,457,680 A * 10/1995 Kamm et al. ................ 370/332
(Continued)

FOREIGN PATENT DOCUMENTS

EP 1806935 7/2007
WO 0251018 6/2002
(Continued)

OTHER PUBLICATIONS

Australian Patent Office, Written Opinion of the International Searching Authority, Jan. 8, 2013 (7 pgs.).
(Continued)

*Primary Examiner* — Andrew Lai
*Assistant Examiner* — Andrew C Lee
(74) *Attorney, Agent, or Firm* — Wood, Herron & Evans, LLP

(57) ABSTRACT

Disclosed is a wireless backhaul network for a communications system. The network comprises a congregate node connected to the communications system; a plurality of access points, each access point having associated amounts of incident bidirectional traffic to be conveyed to and from the congregate node; and a plurality of bidirectional wireless links adapted to convey the traffic between the access points and the congregate node. The congregate node is configured to allocate spectrum to each directional component of each link within a predetermined available spectrum for the conveyance of the traffic, wherein the allocation is dependent on the amounts of traffic at the respective access points.

10 Claims, 10 Drawing Sheets

(51) Int. Cl.
*H04W 28/16* (2009.01)
*H04W 72/08* (2009.01)

(56) References Cited

U.S. PATENT DOCUMENTS

| | | | | |
|---|---|---|---|---|
| 5,506,837 | A * | 4/1996 | Sollner et al. | 370/296 |
| 6,370,185 | B1 * | 4/2002 | Schmutz et al. | 375/214 |
| 6,748,212 | B2 * | 6/2004 | Schmutz et al. | 455/424 |
| 7,085,573 | B1 * | 8/2006 | Trandai et al. | 455/450 |
| 7,574,179 | B2 * | 8/2009 | Barak et al. | 455/101 |
| 7,583,971 | B2 * | 9/2009 | Gorsuch et al. | 455/452.1 |
| 7,756,039 | B2 * | 7/2010 | Yonge, III et al. | 370/235 |
| 7,849,216 | B2 * | 12/2010 | Gong et al. | 709/244 |
| 7,853,264 | B1 * | 12/2010 | Oh | 455/453 |
| 8,027,290 | B2 * | 9/2011 | Balachandran et al. | 370/328 |
| 8,385,189 | B2 * | 2/2013 | Periyalwar et al. | 370/216 |
| 8,400,906 | B2 * | 3/2013 | Lee et al. | 370/206 |
| 8,441,975 | B2 * | 5/2013 | Amini et al. | 370/312 |
| 8,630,267 | B1 * | 1/2014 | Jin | 370/332 |
| 8,649,281 | B2 * | 2/2014 | Nam et al. | 370/252 |
| 2005/0147067 | A1 * | 7/2005 | Mani et al. | 370/336 |
| 2008/0130495 | A1 | 6/2008 | Dos Remedios et al. | |
| 2008/0181183 | A1 * | 7/2008 | Gale et al. | 370/336 |
| 2009/0029645 | A1 * | 1/2009 | Leroudier | 455/7 |
| 2009/0040930 | A1 * | 2/2009 | Yonge et al. | 370/235 |
| 2009/0227263 | A1 * | 9/2009 | Agrawal et al. | 455/452.1 |
| 2009/0279461 | A1 * | 11/2009 | Rao et al. | 370/295 |
| 2009/0323621 | A1 * | 12/2009 | Touboul et al. | 370/329 |
| 2010/0056205 | A1 * | 3/2010 | Fuss | 455/553.1 |
| 2010/0111018 | A1 * | 5/2010 | Chang | 370/329 |
| 2010/0275083 | A1 * | 10/2010 | Nam et al. | 714/748 |
| 2011/0019652 | A1 * | 1/2011 | Atwal | 370/338 |

FOREIGN PATENT DOCUMENTS

| | | |
|---|---|---|
| WO | 2008085327 | 7/2008 |
| WO | 2009113976 | 9/2009 |
| WO | 2011051921 | 5/2011 |

OTHER PUBLICATIONS

Australian Patent Office, International Search Report, Sep. 21, 2011 (3 pgs.).

* cited by examiner

DYNAMIC FREQUENCY ALLOCATION IN WIRELESS BACKHAUL NETWORKS

BACKGROUND

FIG. 1 is a block diagram of an exemplary wireless backhaul network 100 for a communication system. The wireless backhaul network 100 has a tree topology connecting one or more access points, represented by the "leaf" nodes 120-2, 120-3, 120-5, and 120-6, to a "congregate" node 110, which is in turn connected to a core network of a communication system (not shown). Intermediate between the access points 120-2 and 120-3 and the congregate node 110 is the "relay" node 120-1. Likewise, intermediate between the access points 120-5 and 120-6 and the congregate node 110 is the relay node 120-4. Connecting the nodes 120-*i* and the congregate node 110 are 6 bidirectional wireless communication links 130-*i* (i=1, . . . , 6).

Access traffic from surrounding adjacent user devices can be incident at any node 120-*i* in the backhaul network 100, including the relay nodes 120-1, 120-4. The traffic is bidirectional, and can be divided into "uplink" traffic (to be conveyed from the node 120-*i* to the congregate node 110) and "downlink" traffic (to be conveyed from the congregate node 110 to the node 120-*i*). Each bidirectional link, e.g. 130-1, therefore comprises two directional link "components", an uplink 130*u*-1 and a downlink 130*d*-1. The traffic is converted to signals on the links 130-*i* for conveyance through the network 100. The capacity of the wireless backhaul network 100 for conveying this traffic has a strong impact on the capacity of the communication system of which the wireless backhaul network 100 forms part.

The problem of frequency allocation within a backhaul network is how to allocate spectrum within a predetermined frequency range to each directional link component so that as much as possible of the incident traffic at the nodes served by the link may be conveyed through the network. A complication is that links can interfere with one another, e.g. the uplink and downlink components of a single link, or two link components transmitting to the same node, so the allocation must take this potential for interference into account.

In conventional wireless backhaul networks, manual efforts are used to statistically allocate frequencies "optimally" within the network, and then the statistically "optimal" frequency allocations are fixed for months or years. However, the performance of such manual frequency allocation for general tree-structured multiple-hop wireless backhaul networks is extremely low. Hence, to improve access data rates in multi-user communication systems employing backhaul networks, more efficient techniques for frequency allocation are desirable.

SUMMARY

Disclosed are arrangements which seek to address or ameliorate or more of the above problems by dynamically allocating spectrum to links in a wireless backhaul network based on incident traffic amounts at a given time, taking into account interference constraints imposed by the network topology. The allocation may be performed periodically, so that the disclosed arrangements adapt to changing traffic amounts.

According to a first aspect of the present disclosure there is provided a wireless backhaul network for a communications system. The network comprises a congregate node connected to the communications system; a plurality of access points, each access point having associated amounts of incident bidirectional traffic to be conveyed to and from the congregate node; and a plurality of bidirectional wireless links adapted to convey the traffic between the access points and the congregate node. The congregate node is configured to allocate spectrum to each directional component of each link within a predetermined available spectrum for the conveyance of the traffic, wherein the allocation is dependent on the amounts of traffic at the respective access points.

According to a second aspect of the present disclosure, there is provided a method of dynamically configuring a wireless backhaul network for a communications system, the network comprising a congregate node connected to the communications system, a plurality of access points, each access point having associated amounts of incident bidirectional traffic to be conveyed to and from the congregate node, and a plurality of bidirectional wireless links adapted to convey the traffic between the access points and the congregate node. The method comprises computing a bandwidth request associated with each link from the traffic amounts associated with each node connected by the link; and allocating bandwidth within a predetermined available spectrum to each link based on the computed bandwidth requests.

According to a third aspect of the present disclosure, there is provided a congregate node in a wireless backhaul network for a communications system, the network comprising a congregate node connected to the communications system, a plurality of access points, each access point having associated amounts of incident bidirectional traffic to be conveyed to and from the congregate node, and a plurality of bidirectional wireless links adapted to convey the traffic between the access points and the congregate node. The congregate node is adapted to compute a bandwidth request associated with each link from the traffic amounts associated with each node connected by the link; and allocate bandwidth within a predetermined available spectrum to each link based on the computed bandwidth requests.

An advantage of the disclosed arrangements is that less bandwidth is allocated to handle a given amount of traffic than is the case for conventional, manually allocated backhaul networks. In other words, utilisation of allocated spectrum is higher. In addition, the disclosed arrangements require reduced manual efforts in maintaining backhaul networks. No manual effort is required to adjust resource allocation when traffic distribution changes, for example, when more users move into the coverage of an access point.

BRIEF DESCRIPTION OF THE DRAWINGS

One or more embodiments will now be described with reference to the drawings, in which.

DETAILED DESCRIPTION

Figure 1:
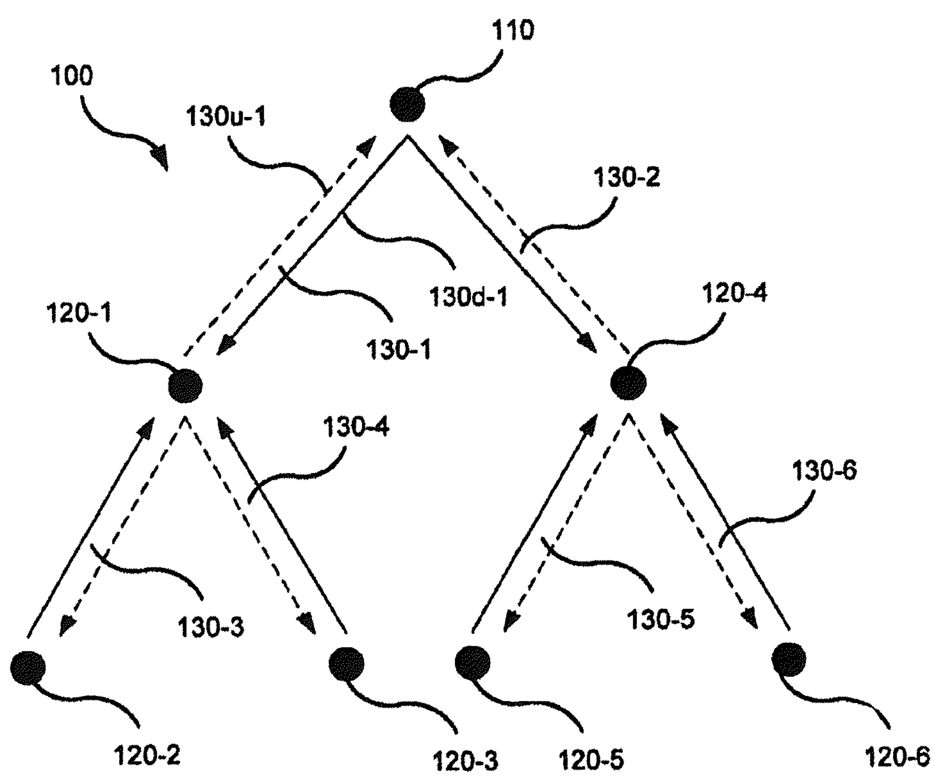
FIG. 1 is a block diagram of an exemplary bidirectional tree-structured wireless backhaul network for a communication system, within which the embodiments of the invention may be practised.

Where reference is made in any one or more of the accompanying drawings to steps and/or features, which have the same reference numerals, those steps and/or features have for the purposes of this description the same function(s) or operation(s), unless the contrary intention appears.

The embodiments of the invention may be practised within a bidirectional tree-structured wireless backhaul network, e.g. the network 100 of FIG. 1. In particular, the congregate node in the wireless backhaul network, e.g. the congregate node 110 in FIG. 1, is responsible for allocating spectrum to the links, e.g. the links 130-*i*, in response to uplink and downlink traffic at each node, e.g. the nodes 120-*i*, served by the links 130-*i* of the backhaul network 100.

Figure 2A:
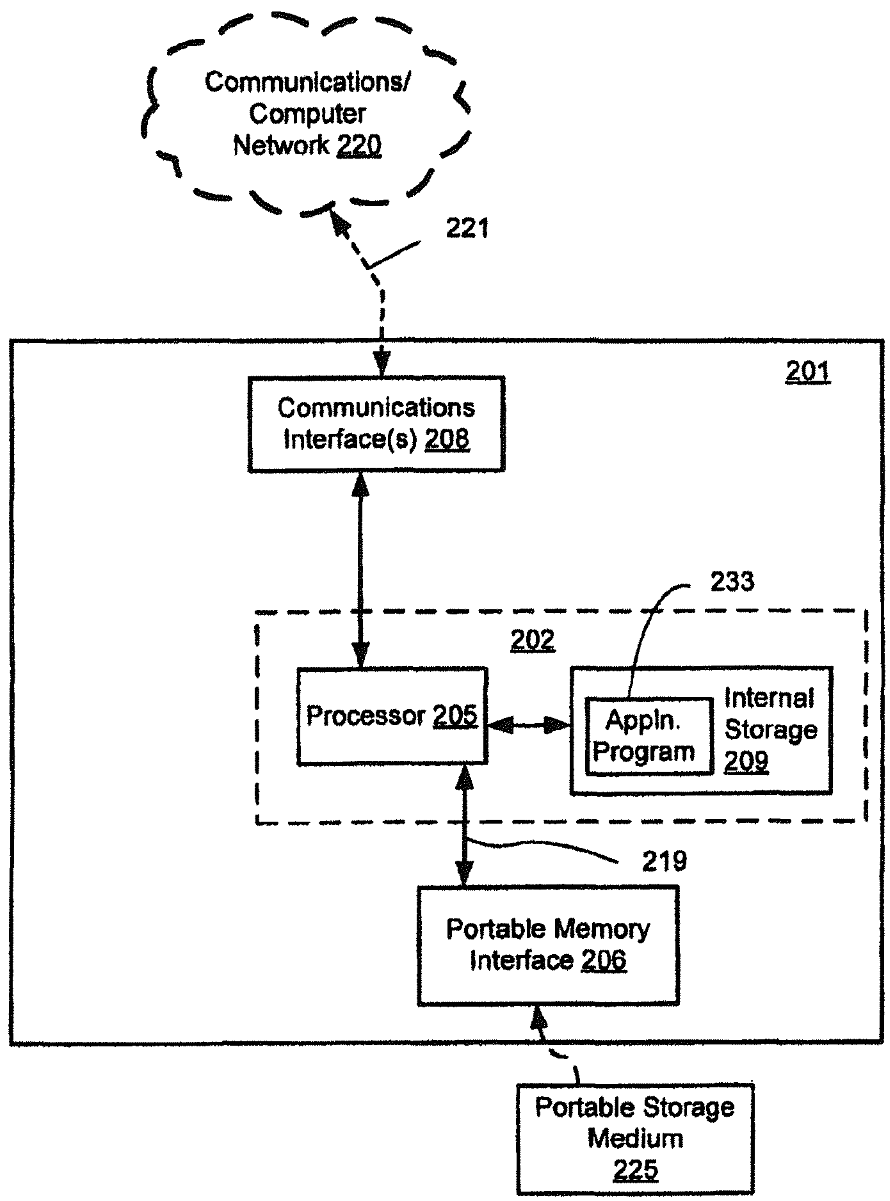
FIGS. 2A and 2B collectively form a schematic block diagram representation of an electronic device as which the congregate node of the system of FIG. 1 may be implemented.
Figure 2B:
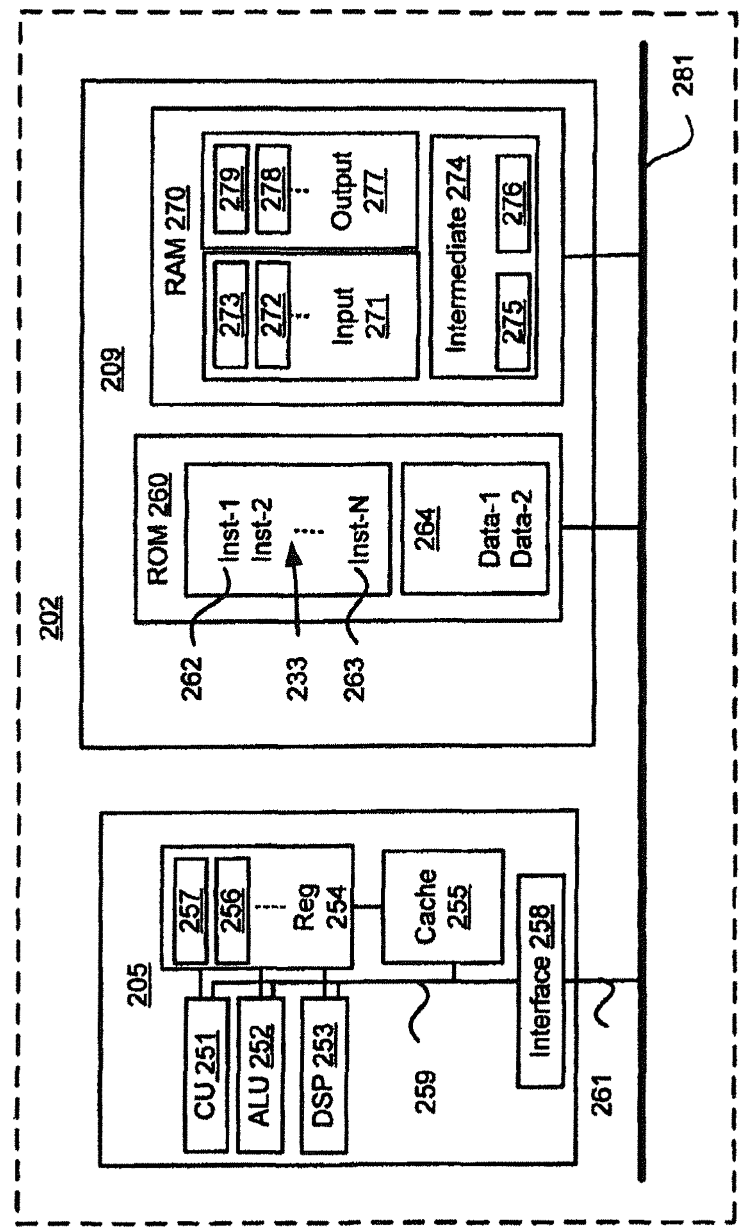

FIGS. 2A and 2B collectively form a schematic block diagram of a general purpose electronic device 201 including embedded components, as which the congregate node 110 in the network 100 of FIG. 1 may be implemented. As seen in FIG. 2A, the electronic device 201 comprises an embedded controller 202. Accordingly, the electronic device 201 may be referred to as an "embedded device." In the present example, the controller 202 has a processing unit (or processor) 205 which is bi-directionally coupled to an internal storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

As seen in FIG. 2A, the electronic device 201 also comprises a portable memory interface 206, which is coupled to the processor 205 via a connection 219. The portable memory interface 206 allows a complementary portable memory device 225 to be coupled to the electronic device 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 201 also has a communications interface 208 to permit coupling of the device 201 to a computer or communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The methods described hereinafter with reference to FIGS. 4 to 9 may be implemented using the embedded controller 202 as one or more software application programs 233 executable within the embedded controller 202. In particular, with reference to FIG. 2B, the steps of the described methods are effected by instructions in the software 233 that are carried out within the controller 202. The software instructions may be formed as one or more code modules, each for performing one or more particular tasks.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be pre-installed in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the electronic device 201. However, in some instances, the application programs 233 may be supplied to the user encoded on one or more portable computer readable storage media 225 and read via the portable memory interface 206 of FIG. 2A prior to storage in the internal storage module 209. In another alternative, the software application program 233 may be read by the processor 205 from the network 220, or loaded into the controller 202 or the portable computer readable storage medium 225 from other computer readable media. Computer readable storage media refers to any non-transitory or tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 201. Examples of transitory or non-tangible computer readable transmission media that may also participate in the provision of software, application programs, instructions and/or data to the device 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 2B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the electronic device 202 is initially powered up, a system program resident in the ROM 260 is executed. The application program 233 is permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The application program 233 includes a sequence of instructions 262 though 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. This set of instructions may be organised into blocks, which perform specific tasks or handle specific events that occur in the electronic device 201. Typically, the application program 233 waits for events and subsequently executes the block of code associated with that event. Events may be triggered in response to sensors and interfaces in the electronic device 201.

The execution of a set of the instructions may require numeric variables to be read and modified. Such numeric variables are stored in the RAM 270. The disclosed method uses input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 233, and is performed by repeated execution of a fetch-execute cycle in the processor 205 or similar programmatic operation of other independent processor blocks in the electronic device 201.

Formulation of the Problem

The disclosed arrangements allocate spectrum to links 130-*i* in variable-width portions or "subbands" of a predetermined available band of wireless spectrum. The following notation is used in the present disclosure:

L: number of non-congregate nodes (120-*j* in FIG. 1) and (bidirectional) links (130-*i* in FIG. 1) in the wireless backhaul network (e.g. for the network 100, L=6).

$l_i$ (i=1, . . . , L): bidirectional backhaul link $l_i^u$: uplink component of link $l_i$ $l_i^d$: downlink component of link $l_i$ $r_j^u$ (j=1, . . . , L): uplink access traffic (bandwidth request) at node j $r_j^d$ (j=1, . . . , L): downlink access traffic (bandwidth request) at node j $R_i^u$: uplink backhaul traffic (bandwidth request) at uplink $l_i^u$ $R_i^d$: downlink backhaul traffic (bandwidth request) at downlink $l_i^d$ $I_i^u$: number of subbands of available spectrum allocated to uplink $l_i^u$ $I_i^d$: number of subbands of available spectrum allocated to downlink $l_i^d$ $U_{i,j}$: upper-edge of the j-th subband allocated to uplink $l_i^u$ (j=1, . . . , $I_i^u$)

$u_{i,j}$: lower edge of the j-th subband allocated to uplink $l_i^u$ $D_{i,j}$: upper edge of the j-th subband allocated to downlink $l_i^d$ $d_{i,j}$: lower edge of the j-th subband allocated to downlink $l_i^d$ $\Delta u_{i,j}=U_{i,j}-u_{i,j}$: bandwidth of the j-th subband allocated to uplink $l_i^u$ $\Delta d_{i,j}=D_{i,j}-d_{i,j}$: bandwidth of the j-th subband allocated to downlink $l_i^d$ The aim of the disclosed allocation method is to choose $(u_{i,j}, d_{i,j}, U_{i,j}, D_{i,j}, I_i^u, I_i^d)$ for i=1, . . . , L so as to maximise the minimal satisfaction factor across all links:

$$\left(u_{i,k}^{opt}, d_{i,l}^{opt}, U_{i,k}^{opt}, D_{i,l}^{opt}, I_i^{u,opt}, I_i^{d,opt}, k=1, \ldots, I_i^{u,opt}, l=1, \ldots, I_i^{d,opt}, i=1, \ldots, L\right) = \max_{\substack{u_i,d_i,U_i,D_i,I_i^u,I_i^d \\ i=1, \ldots, L}} \left(\min\left(\min_{i=1, \ldots L}\left(\frac{\sum_{j=1}^{I_i^u} \Delta u_{i,j}}{R_i^u}\right), \min_{i=1, \ldots L}\left(\frac{\sum_{j=1}^{I_i^d} \Delta d_{i,j}}{R_i^d}\right)\right)\right) \tag{1}$$

The allocation is subject to the following, constraints:

Constraint 1: To keep the data rates in consistency (in other words, to avoid congestion at any node), the allocated uplink and downlink bandwidths of a link should be the sums of the allocated bandwidths of the uplink and downlink components of the "one-hop subordinate links" of that link respectively. That is, $$e_i^u \sum_{k=1}^{I_i^u} \Delta u_{i,k} = \sum_{j \in S_i}\left(e_j^u \sum_{k=1}^{I_j^u} \Delta u_{j,k}\right) \tag{2}$$

for the uplinks $l_i^u$, and $$e_i^d \sum_{k=1}^{I_i^d} \Delta d_{i,k} = \sum_{j \in S_i}\left(e_j^d \sum_{k=1}^{I_i^d} \Delta d_{j,k}\right) \tag{3}$$

for the downlinks $l_i^d$, where $S_i$ is the set of one-hop subordinate links of link $l_i$. For example, the one-hop subordinate links of link 130-1 in the network 100 are the links 130-3 and 130-4. The quantities $e_i^u$ and $e_i^d$ are the achievable spectral efficiencies of the uplink component $l_i^u$ and the downlink component $l_i^d$, respectively. These quantities, in bits/sec/Hz, indicate the properties of the wireless channels used for the links and can be obtained through measurement.

Constraint 2: the allocated spectra for the uplink and downlink components of a link should be $B_{FDD}$ apart in frequency to avoid mutual interference, where $B_{FDD}$ is the frequency division duplex (FDD) Separation Bandwidth. Specifically, if the l-th subband of downlink $l_i^d$ is located higher than k-th subband of uplink $l_i^d$ on the frequency axis, $$d_{i,j}-U_{i,k}\geq B_{FDD} \quad (4a)$$

If the l-th subband of downlink $l_i^d$ is located lower than k-th subband of uplink $l_i^u$ on the frequency axis, $$u_{i,k}-D_{i,j}\geq B_{FDD} \quad (4b)$$

Constraint 3: Two directional links transmitting to (terminating at) the same node arc termed "incompatible" links. For example, in the wireless backhaul network 100, the uplinks of links 130-3 and 130-4 are incompatible because both transmit to the same node 120-1. Incompatible links must be $B_G$ apart in frequency to avoid adjacent-frequency interference, where $B_G$ is the Guard Bandwidth. That is, for incompatible uplinks $l_i^u$ and $l_j^u$, if the k-th subband of uplink $l_i^u$ is located higher than l-th subband of uplink $l_j^u$ on the frequency axis, $$u_{i,k}-U_{i,j}\geq B_G. \quad (5a)$$

If the k-th subband of uplink $l_i^u$ is located lower than l-th subband of uplink $l_i^u$ on the frequency axis, $$u_{i,j}-U_{i,k}\geq B_G. \quad (5b)$$

For incompatible uplink $l_i^u$ and downlink $l_j^d$, if the k-th subband of uplink $l_i^u$ is located higher than l-th subband of downlink $l_j^d$ on the frequency axis, $$u_{i,k}-D_{i,j}\geq B_G. \quad (5c)$$

If the k-th subband of uplink $l_i^u$ is located lower than l-th subband of downlink $l_j^d$ on the frequency axis, $$d_{i,j}-U_{i,k}\geq B_G \quad (5d)$$

Constraint 4: Any two link components simultaneously transmitting to and from a single node should be at least $B_{FDD}$ apart in frequency to avoid mutual interference. For example, in the wireless backhaul network 100, the uplink components of links 130-3 and 130-1 are transmitting to and from the node 120-1 respectively and should therefore have allocations at least $B_{FDD}$ apart in frequency. Likewise, the uplink component of link 130-3 and the downlink component of link 130-4 are transmitting to and from the node 120-1 respectively and should therefore have allocations at least $B_{FDD}$ apart in frequency.

That is, if the k-th subband of uplink $l_i^u$ is located higher than l-th subband of downlink $l_j^d$ on the frequency axis, $$u_{i,k}-D_{j,i}\geq B_{FDD}. \quad (6a)$$

If the k-th subband of uplink $l_i^u$ is located lower than l-th subband of downlink $l_j^d$ on the frequency axis, $$d_{i,j}-U_{i,k}\geq B_{FDD}. \quad (6b)$$

If the k-th subband of uplink $l_i^u$ is located higher than l-th subband of uplink $l_j^u$ on the frequency axis, $$u_{i,k}-U_{j,i}\geq B_{FDD}. \quad (6c)$$

If the k-th subband of uplink $l_i^u$ is located lower than l-th subband of uplink $l_j^u$ on the frequency axis, $$u_{j,i}-U_{i,k}\geq B_{FDD}. \quad (6d)$$

If the k-th subband of downlink $l_i^d$ is located higher than l-th subband of downlink $l_j^d$ on the frequency axis, $$d_{i,k}-D_{j,i}\geq B_{FDD}. \quad (6e)$$

If the k-th subband of downlink $l_i^d$ is located lower than l-th subband of downlink $l_j^d$ on the frequency axis, $$d_{j,i}-D_{i,k}\geq B_{FDD} \quad (6f).$$

Constraint 5: all the allocated spectra should be within the available continuous spectrum, i.e. from $f_{lower}$ to $f_{upper}$. That is, $$\max_{\substack{k=1, \ldots ,t_i^u, l=1, \ldots , t_i^d \\ i=1, \ldots ,L}} (U_{i,k}, D_{i,l}) \leq f_{upper} \quad (7a)$$

$$\min_{\substack{k=1, \ldots ,t_i^u, l=1, \ldots t_i^d \\ l=1, \ldots ,L}} (u_{i,k}, d_{i,l}) \geq f_{lower} \quad (7b)$$

Thus formulated, the allocation problem potentially involves a large number of unknown variables, and the computational complexity of a constrained global optimisation according to equation (1) is therefore impractically high in most situations. It is also important to note that a transceiver with the capability of reconfiguring its bandwidths and carrier frequencies for transmission and reception is required, which increases the cost.

Solution

Figure 3:
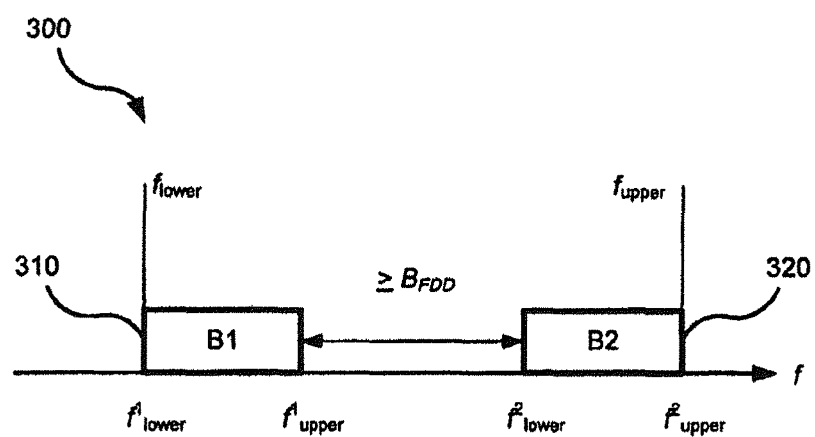
FIG. 3 illustrates the two bands in a frequency division duplex (FDD) structure.

To satisfy constraints 2 and 4, a frequency division duplex (FDD) structure is imposed on the wireless backhaul network. In an FDD wireless backhaul network, two frequency bands (labelled herein as band 1, or B1, and band 2, or B2) separated by at least $B_{FDD}$ are defined within the range ($f_{lower}$, $f_{upper}$) for use by the links 130-*i*, as illustrated in FIG. 3, B1 (310) extends on the frequency axis 300 from $f_{lower}^1$ to $f_{upper}^1$, and B2 (320) extends from $f_{lower}^2$ to $f_{upper}^2$, where $f_{lower}\leq f_{lower}^1<f_{upper}^1<f_{lower}^2<f_{upper}^2\leq f_{upper}$ and $f_{lower}^2-f_{upper}^1\geq B_{FDD}$. FIG. 3 illustrates the symmetrical situation where B1 and B2 are of equal and maximal width $$\frac{f_{upper}-f_{lower}-B_{FDD}}{2}.$$

In an FDD wireless backhaul network, each node 120-*i* receives signals on one of the FDD bands and transmits signals on the other FDD band. For example, in the wireless backhaul network 100, under the FDD structure the relay node 120-1 receives uplink signals from access points 120-2 and 120-3 and a downlink signal from the congregate node 110 on B1 and transmits downlink signals to the access points 120-2 and 120-3 and an uplink signal to the congregate node 110 on B2.

A bidirectional tree-structured wireless backhaul network (e.g. the network 100) with FDD structure is effectively partitioned into two sub-networks (in other words, two directional trees), $SN_1$ and $SN_2$. Each sub-network $SN_m$ utilises only one of the two FDD bands. In FIG. 1, the link components utilising B1 are represented by solid arrows and the link components utilising B2 are represented by dashed arrows. The two sub-networks are thus represented side-by-side in FIG. 1.

The effect of an FDD structure is that every end-to-end signal alternates between B1 and B2 as it traverses each uplink or downlink. As a result of the alternate use of shared FDD bands, the data rates of uplink and downlink in the FDD wireless backhauling network 100 are correlated.

FDD has been widely implemented in transceivers. The use of separate bands for transmission and reception reduces the complexity and cost of transceiver hardware. The FDD structure also simplifies spectrum assignment and maintenance for the radio spectrum regulators.

Figure 4:
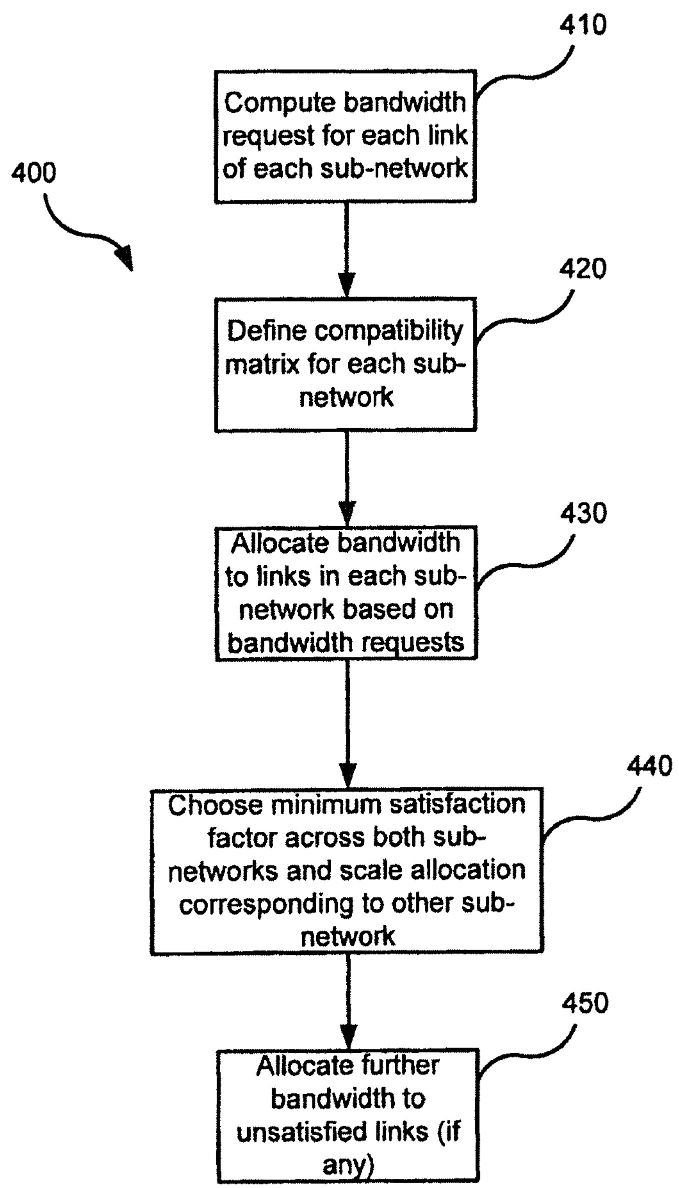
FIG. 4 is a flow chart illustrating a method of frequency allocation in a wireless backhaul network according to one embodiment.

FIG. 4 is a flow chart illustrating a method 400 of frequency allocation in an FDD wireless backhaul network, e.g. the wireless backhaul network 100, according to one embodiment. The method 400 is carried out by the congregate node 110. The method 400 may be performed periodically, at fixed or varying intervals, so that the frequency allocation in the wireless backhaul network 100 is dynamic, i.e. adaptive to changing traffic amounts.

The method 400 starts at the step 410, where the congregate node 110 computes the bandwidth request $R_i^u$ in Hertz at each uplink $l_i^u$ from the sum of the uplink data rate requests $r_j^u$ (in bits per second) at the nodes 120-*j* in the subordinate tree "below" that uplink in the uplink direction divided by the spectral efficiency at uplink $l_i^u$:

$$R_i^u = \frac{\sum_{j \in T_i} r_j^u}{e_i^u} \tag{8}$$

where $T_i$ is the set of nodes in the subordinate tree below uplink $l_i^u$ and $e_i^u$ is the achievable spectral efficiency of the uplink $l_i^u$. For example, the uplink bandwidth request $R_i^u$ at the uplink component 130*u*-1 of link 130-1 in the wireless backhaul network 100 is equal to the sum of the uplink data rate requests $r_1^u$, $r_2^u$, and $r_3^u$ at the relay node 120-1, access point 120-2, and access point 120-3, respectively, divided by the spectral efficiency at uplink component 130*u*-1.

The congregate node 110 then (still at step 410) computes the bandwidth request $R_i^d$ in Hertz at each downlink $l_i^d$ from the sum of the downlink data rate requests $r_j^d$ (in bits per second) at the nodes in the subordinate tree "below" that downlink still in the uplink direction divided by the spectral efficiency of the downlink $l_i^d$.

$$R_i^d = \frac{\sum_{j \in T_i} r_j^d}{e_i^d} \tag{9}$$

where $e_i^u$ is the achievable spectral efficiency of the downlink $l_i^d$. For example, the downlink bandwidth request $R_i^d$ at the downlink component 130*d*-1 of link 130-1 in the wireless backhaul network 100 is equal to the sum of the downlink bandwidth request $r_1^d$, $r_2^d$ and $r_3^d$ at the relay node 120-1, access point 120-2 and access point 120-3, respectively, divided by the spectral efficiency at downlink component 130*d*-1.

The computations at step 410, together with the subsequent steps, guarantee that Constraint 1 is satisfied.

After step 410, each link in the sub-network $SN_1$ associated with B1 has an associated bandwidth request $R_1^1$. For example, for the backhaul sub-network $SN_1$ (represented with solid arrows in FIG. 1) of the wireless backhaul network 100, the bandwidth request $R_1^1$ associated with link 130-1 is the downlink bandwidth request $R_1^d$. Likewise, each link in the sub-network $SN_2$ associated with B2 has an associated bandwidth request $R_1^2$. For the backhaul sub-network $SN_2$ (represented with dashed arrows in FIG. 1) of the wireless backhaul network 100, the bandwidth request $R_1^2$ associated with link 130-1 is the uplink bandwidth request $R_1^u$.

In the next step 420, the congregate node 110 defines an L by L "compatibility matrix" $CM_m$ for each sub-network $SN_m$ based on the topology of the sub-network (m=1 or 2 indicates the current sub-network and associated FDD band). Each entry of $CM_m$ indicates whether a guard band is required between backhaul links 130-*i* and 130-*j* in the associated sub-network $SN_m$. If a guard band is not required, i.e. links 130-*i* and 130-*j* are compatible, $CM_m(i,j)=1$; otherwise, $CM_m(i,j)=0$ (note $CM_m(i,i)=0$ for all i=1, . . . , L). As described above in Constraint 3, two links in a sub-network are compatible unless they terminate at the same node in the sub-network.

Based on this definition, for the exemplary backhaul network 100 of FIG. 1, links 130-3, 130-4, and 130-1 are mutually incompatible in $SN_1$ as they all terminate at node 120-1. Likewise, links 130-5, 130-6, and 130-2 are mutually incompatible in $SN_1$ as they all terminate at node 120-4. However, in $SN_2$, only links 130-1 and 130-2 are incompatible as they both terminate at the congregate node 110. The compatibility matrices $CM_1$ and $CM_2$ for B1 and B2 respectively in the exemplary backhaul network 100 are therefore defined as follows:

$$CM_1 = \begin{bmatrix} 0&1&0&0&1&1\\ 1&0&1&1&0&0\\ 0&1&0&0&1&1\\ 0&1&0&0&1&1\\ 1&0&1&1&0&0\\ 1&0&1&1&0&0 \end{bmatrix},\ CM_2 = \begin{bmatrix} 0&0&1&1&1&1\\ 0&0&1&1&1&1\\ 1&1&0&1&1&1\\ 1&1&1&0&1&1\\ 1&1&1&1&0&1\\ 1&1&1&1&1&0 \end{bmatrix} \tag{10}$$

Figure 5A:
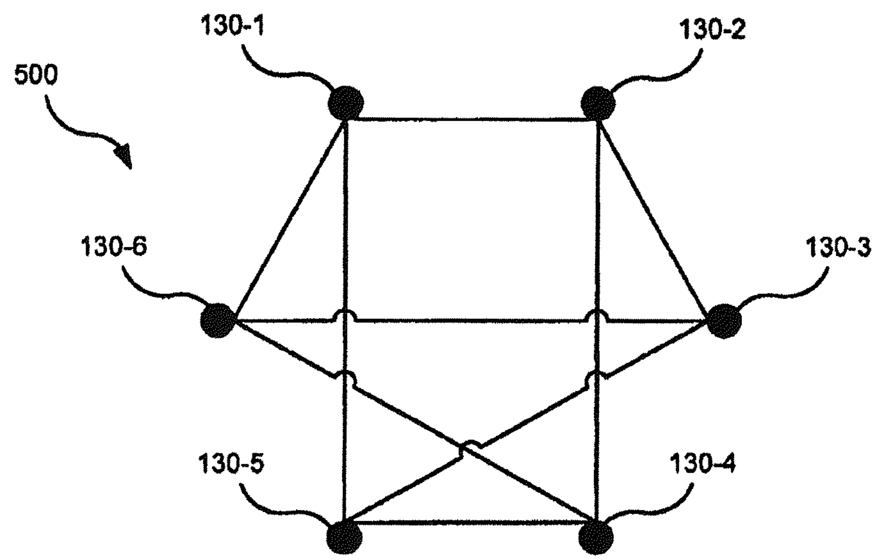
FIGS. 5A and 5B illustrate the compatibility graphs for bands 1 and 2 respectively for the exemplary wireless backhaul network of FIG. 1.
Figure 5B:
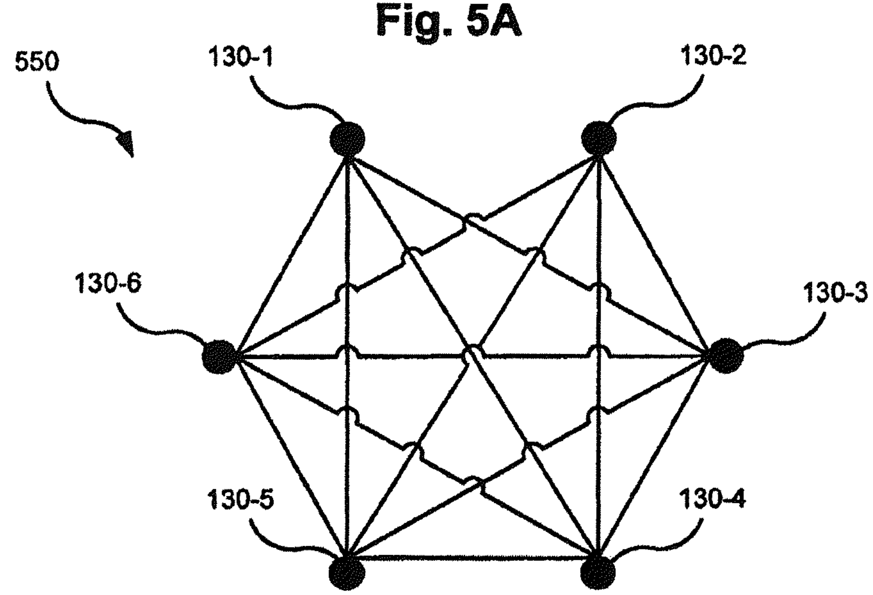

The compatibility matrix $CM_m$ defines a "compatibility graph" $CG_m$ for the sub-network $SN_m$. Each vertex in a compatibility graph $CG_m$ represents a link in the sub-network $SN_m$, e.g. 130-*i*, and two vertices are joined by a non-directional edge if the corresponding links 130-*i* and 130-*j* are compatible, i.e. $CM_m(i,j)=1$ FIGS. 5A and 5B illustrate the compatibility graphs $CG_1$ (500) and $CG_2$ (550) for $SN_1$ and $SN_2$ respectively of the exemplary backhaul network 100 of FIG. 1. The vertices in the graphs $CG_1$ and $CG_2$ are labelled with the corresponding links 130-*i* and are joined by edges according to the matrices $CM_1$ and $CM_2$ above. It may be seen that the graph $CG_2$ is more "connected" to than the graph $CG_1$, since the only edge missing from the graph $CG_2$ is between vertices corresponding to the incompatible (in $SN_2$) links 130-1 and 130-2.

At the next step 430 of the method 400, the congregate node 110 allocates bandwidth to the links in each sub-network $SN_m$ based on the bandwidth requests $R_i^m$ computed at step 410. Step 430 will be described in detail below with reference to FIG. 6.

Figure 6:
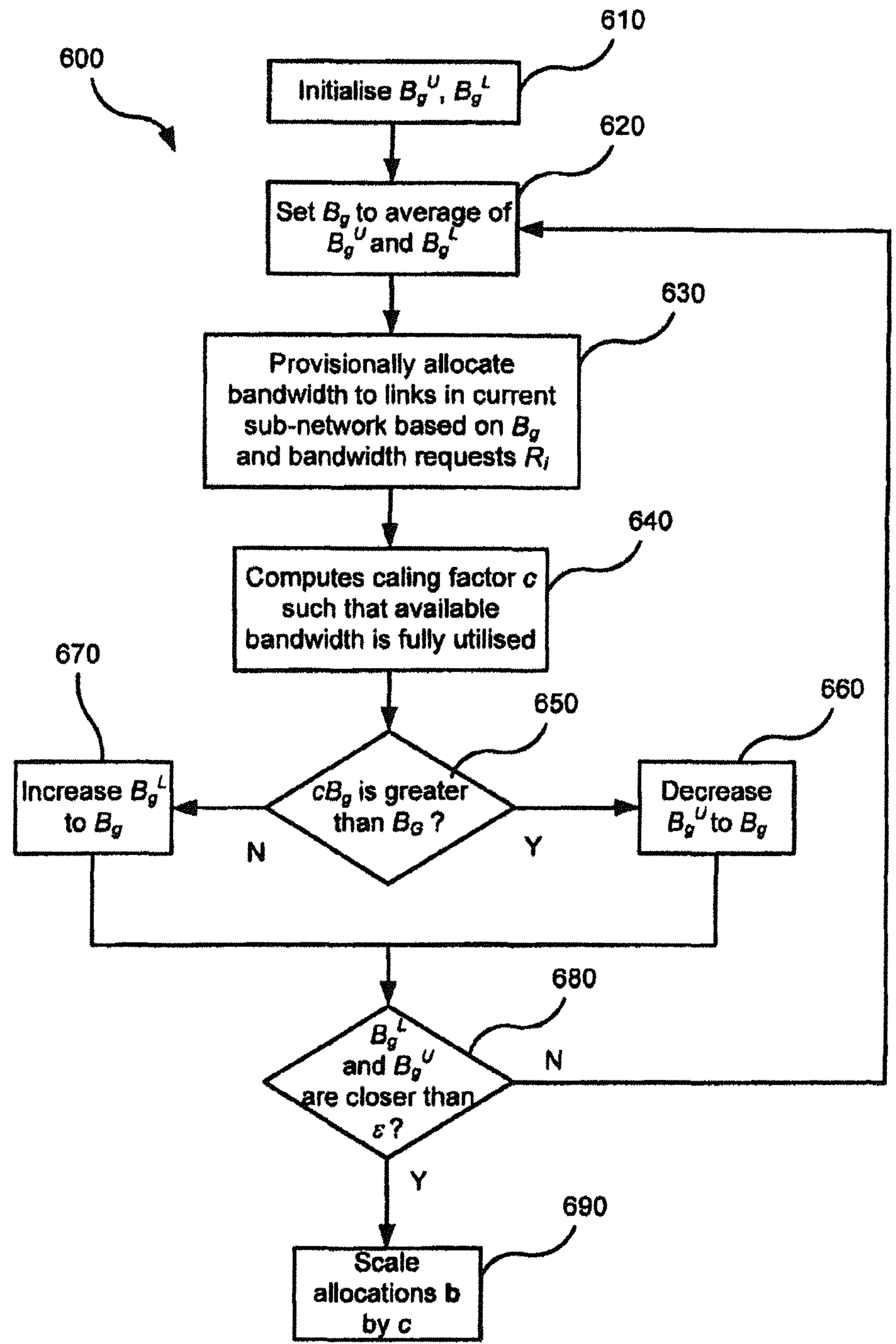
FIG. 6 is a flow chart illustrating a method of allocating bandwidth to links in a wireless backhaul network, as used in the method of FIG. 4.

FIG. 6 is a flow chart illustrating a method 600 of allocating bandwidth to links in a backhaul sub-network, as used in step 430 of the method 400 of FIG. 4. The method 600 is carried out twice (independently) in step 430, once for the sub-network $SN_1$ (m=1) and once for the sub-network $SN_2$ (m=2). (The sub- and super-scripts m are omitted from FIG. 6 for ease of reading.) The method 600 uses a "provisional" guard band amount $B_g$ that is initially set larger than the guard bandwidth $B_G$, and works through the sub-network, allocating subbands of the corresponding band to the links in a way that satisfies constraint 3 above until all the bandwidth requests have been satisfied. The provisional guard band amount $B_g$ is then adjusted based on the total amount of bandwidth allocated, and the allocation is performed again with the new provisional guard band amount. This process is repeated until the provisional guard band amount $B_g$ converges to $B_G/c_m$, where $c_m$ is a scaling factor to be provided by Step 640.

The method 600 starts at step 610 where upper and lower limits for $B_g$, namely $B_g^U$ and $B_g^L$, are initialised. The initial values of $B_g^U$ and $B_g^L$ should be sufficiently large and small, respectively, to ensure $B_G/c_m$ is in between those limits. Typical initial values are $B_g^L=0$ and $B_g^U=C\times B_G$, where C is a predefined constant equal to 1.0e+03.

Step 620 follows, at which the provisional guard band amount $B_g$ is set to the average of the upper and lower limits $B_g^U$ and $B_g^L$. The method 600 then proceeds to step 630, at which the congregate node 110 provisionally allocates bandwidth in the current band to the links 130-*i* in the associated sub-network $SN_m$ based on the bandwidth requests $R_i^m$ using the provisional guard band amount $B_g$, and taking into account the compatibility constraints encapsulated in the matrix $CM_m$. The result of step 630 is a K-vector $b^m$ of provisional allocation bandwidths $b_h^m$ (k=1, . . . , K), where K is the number of subbands, and a binary K-by-L "occupation matrix" $C^m$. The i-th column $c_i^m$ of the occupation matrix $C^m$ is the binary "occupation vector" of link 130-*i*, indicating which of the K subbands are allocated to that link. The provisional bandwidth allocation to link 130-*i* may be written in terms of the earlier defined "bandwidth" variables as $$\sum_{j=1}^{t_i^u} \Delta u_{i,j} = (b^m)^T c_i^m \tag{11a}$$

for uplinks in sub-network m and $$\sum_{j=1}^{t_i^d} \Delta d_{i,j} = (b^m)^T c_i^m \tag{11b}$$

for downlinks in sub-network m.

Step 630 will be described in detail below with reference to FIG. 7.

After step 630, the bandwidth request associated with each link has been satisfied by the provisional allocation. However, the total available bandwidth $BW_m$ in the current band, defined as $$BW_m = f_{upper}^m - f_{lower}^m \tag{12}$$

may have been exceeded by the total provisionally allocated bandwidth. At the next step 640, the congregate node 110 therefore computes the "utilisation ratio" $U_m$ of the total to provisionally allocated bandwidth to the available bandwidth in the current band:

$$U_m = \frac{\sum_{k=1}^{K} b_k^m}{BW_m} \tag{13}$$

If the utilisation ratio $U_m$ is greater than one, the provisional allocation from step 630 is downscaled to precisely fit the current band. In step 640, the congregate node 110 computes the scaling factor $c_m \le 1$ that would make the total provisionally allocated bandwidth from step 630 equal to the available bandwidth $BW_m$ in the current band:

$$c_m = \min\left(\frac{BW_m}{\sum_{k=1}^{K} b_k^m}, 1\right) \tag{14}$$

Note that the computed scaling factor $c_m$ is the reciprocal of the utilisation ratio $U_m$, if $U_m>1$; otherwise, the scaling factor $c_m$ is one since no downscaling is required.

Step 650 follows, at which the congregate node 110 determines whether the scaled provisional guard band amount $c_mB_g$ is greater than the absolute lower limit $B_G$. If so, the method 600 proceeds to step 660; if not, the method 600 proceeds to step 670. At step 660, the provisional guard band amount $B_g$ may be reduced, so the congregate node 110 decreases the upper limit $B_g^U$ to $B_g$. At step 670, the provisional guard band amount $B_g$ is too small, so the congregate node 110 increases the lower limit $B_g^L$ to $B_g$. After both step 660 and 670, the method 600 proceeds to step 680, at which the congregate node 110 determines whether the upper limit $B_g^U$ and the lower limit $B_g^L$ have converged within a small predetermined separation $\epsilon$ (typically set to 1e-6), If not, the method 600 returns to step 620 for another pass through the provisional bandwidth allocation with an adjusted value of the provisional guard band $B_g$. If the upper limit $B_g^U$ and the lower limit $B_g^L$ have converged sufficiently, no further adjustment may be made to the provisional guard band amount $B_g$. The method 600 then proceeds to step 690, where the congregate node 110 obtains the final provisionally allocated bandwidth amounts by scaling the provisional allocated bandwidth vector $b^m$ obtained in the last execution of step 630 by the final scaling factor $c_m$ computed in the last execution of step 640. The method 600 then concludes. It may be shown that, after step 690, the final scaled provisional guard band amount $c_mB_g$ is equal to the minimum guard band amount $B_G$.

The described method 600 uses the "bisection" method to adjust the value of $B_g$ for each iteration, because each adjustment of $B_g$ is half the size of the previous adjustment. In alternative implementations of the step 430, there are no limits $B_g^U$ and $B_g^L$; instead $B_g$ is adjusted in step 620 by some other means, and step 680 tests whether $c_mB_g$ has converged sufficiently closely to $B_G$.

The "satisfaction factor" of a link 130-*i* is defined as the ratio of total bandwidth allocated to the link to the bandwidth request associated with the link:

$$SF_i^m = \frac{(b^m)^T c_i^m}{R_i^m} \tag{15}$$

As mentioned above, after step 630, the satisfaction factor of each link 130-*i* is equal to one. Because of the final scaling (step 690) of the provisionally allocated bandwidth vector $b^m$ by the final scaling factor $c_m$, step 430 leaves the final satisfaction factor $SF_i^m$ equal to $c_m$ for all links 130-*i* (i=1, . . . L).

Figure 7:
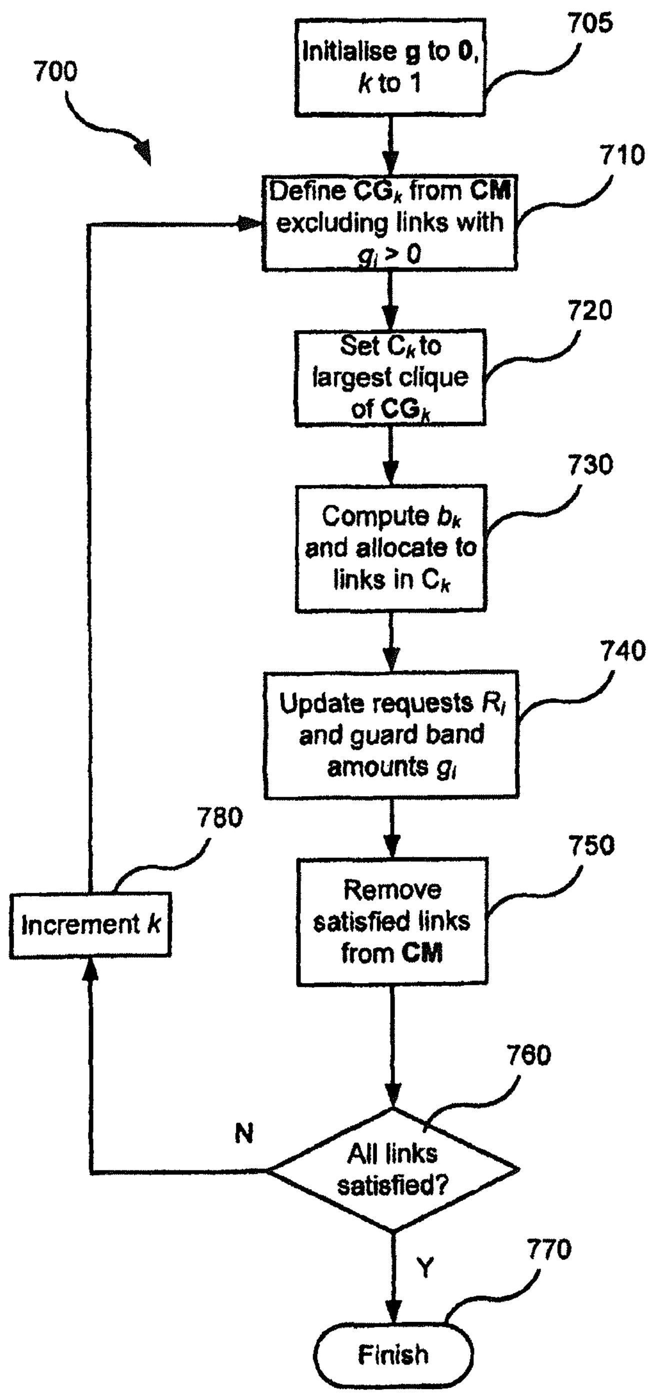
FIG. 7 is a flow chart illustrating a method of provisionally allocating bandwidth to links in a wireless backhaul network, as used in the method of FIG. 6.

FIG. 7 is a flow chart illustrating a method 700 of provisionally allocating bandwidth to links 130-*i* in the backhaul sub-network $SN_m$ associated with the current FDD band, as used in step 630 of the method 600 of FIG. 6. (The sub- and super-scripts m are omitted in the following description and from FIG. 7 for ease of reading). The method 700 starts allocating spectrum from the lower limit $f_{lower}$ of the current band.

The method 700 starts at step 705 where the congregate node 110 initialises to zero a "guard band vector" g of length L, each entry $g_i$ of which indicates the amount of bandwidth required to be reserved in the corresponding link 130-*i* from the end of the subband allocated in the previous iteration before any further spectrum can be allocated to the link 130-*i*. Also, a subband counter k is initialised to one.

At the next step 710, the method defines a compatibility graph $CG_k$ for the current iteration k from the compatibility matrix CM for the current sub-network, excluding each row and column of CM corresponding to a link 130-*i* that has a non-zero value of $g_i$ in the guard band vector g.

Step 720 follows, at which the congregate node 110 computes the cliques of the current compatibility graph $CG_k$. (A clique of a graph is defined as a subset of the nodes of the graph, each pair of which is connected by a graph edge. A clique can be of size one.) The congregate node 110 chooses the clique $C_k$ with the largest cardinality (number of nodes). The congregate node 110 then (at step 730) computes the width $b_k$ of the subband to be allocated to the links belonging to the chosen clique $C_k$ as follows:

$$b_k = \min\left(\min_{i \in C_k}(R_i), \min_{j:g_j>0}(g_j)\right) \quad (16)$$

The allocation is also performed at step 730 by setting the entries in the k-th row of the occupation matrix C corresponding to the chosen clique $C_k$ equal to one.

At the next step 740, the congregate node 110 updates the bandwidth request values of $R_i$ for the links in the chosen clique $C_k$ by subtracting the allocation amount $b_k$:

$$R_i \to R_i - b_k, i \in C_k \quad (17)$$

Also at step 740, the congregate node 110 updates the non-zero guard band vector to entries $g_i$ by subtracting the allocation amount $b_k$:

$$g_i \to g_i - b_k, i : g_i > 0 \quad (18)$$

As a consequence, either one or more of the links in clique $C_k$ is fully satisfied ($R_i$ goes to 0) or at least one of the guard band-requiring links no longer requires a guard band ($g_i$ goes to 0).

Finally at step 740, the congregate node 110 ensures that each guard band vector entry $g_j$ corresponding to a link 130-*j* that is incompatible with the links 130-*i* in the chosen clique $C_k$ (as determined from the compatibility matrix CM) have value at least equal to the provisional guard band amount $B_g$.

At step 750, the congregate node 110 removes from CM the row and column corresponding to any link 130-*i* that is fully satisfied, i.e. whose value of $R_i$ has gone to 0. Step 760 follows, at which it is determined whether CM is null, i.e. whether all links are fully satisfied. If not, the method 700 increments k (step 780) and returns to step 710 for the next iteration. Otherwise, all links 130-*i* are fully satisfied and the method 700 concludes (step 770).

Figure 8:
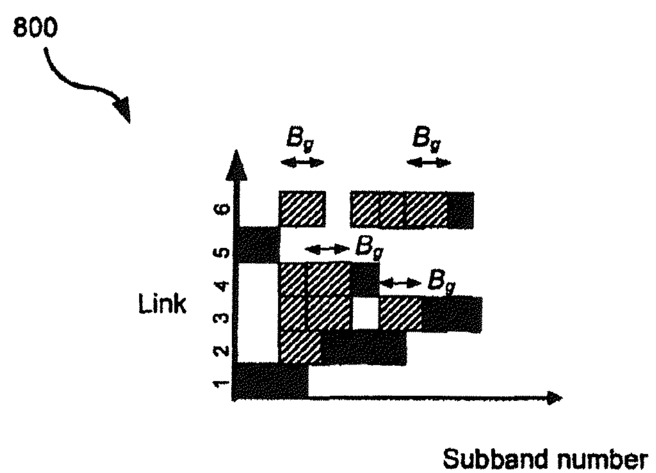
FIG. 8 illustrates an exemplary provisional bandwidth allocation to links in a sub-network of the exemplary wireless backhaul network of FIG. 1.

FIG. 8 illustrates an exemplary provisional bandwidth allocation 800 to links 130-*i* in a sub-network of the exemplary wireless backhaul network 100 of FIG. 1. The provisional bandwidth allocation 800 results from the application of the method 700 to the sub-network $SN_1$ associated with FDD band 1 for some exemplary values of $R_i^1$ and $B_g$. Each row of the allocation 800 represents a link 130-*i* in the sub-network $SN_1$, numbered i=1 to 6 from bottom to top. Each column represents a subband k, of which there are K=10. The solid blocks in each row represent spectrum allocated to the corresponding link in the corresponding subband for conveying signals. The diagonally hatched blocks represent reserved spectrum not to be used for conveying signals in the corresponding subband.

It may be seen in the bandwidth allocation 800 that incompatible links 1, 3, and 4 do not share any allocated subbands, and their respective allocated subband blocks are separated by at least the provisional guard band amount $B_g$, as required by constraint 3. Likewise, incompatible links 2, 5, and 6 do not share any allocated subbands, and their respective allocated Subband blocks are separated by at least the provisional guard band amount $B_g$, as required by constraint 3. Also, compatible links 1 and 5, 2 and 4, and 3 and 6 share allocated subbands 1, 5, and 9 respectively. In particular, links 2 and 4 share subband 5 which is also reserved as a guard band of link 6 (which is incompatible with link 2). The ability of the method 700 to share spectrum between compatible links and to allocate spectrum to links within subbands reserved for guard bands by other, incompatible links makes the bandwidth allocation 800 efficient in terms of total allocated bandwidth.

After step 430, the final satisfaction factors of the links in each sub-network are not in general equal, since in general $c_1 \neq c_2$. To ensure consistency of data rates, at step 440 the congregate node 110 equalises the satisfaction factor across both sub-networks. To do this, the congregate node 110 chooses the lower of the two final scaling factors ($c_1$, $c_2$) from the two FDD bands:

$$c_{min} = \min(c_1, c_2) \quad (19)$$

The bandwidth allocation for the band $m_{min}$ corresponding to $c_{min}$ is kept unchanged. The allocated subband widths of the other band $m_{max}$ are scaled down by $c_{min}/c_{max}$, while the reserved guard band portions are not scaled (and therefore remain of width $B_G$). After step 440, the satisfaction factor of both sub-networks is equal to $c_{min}$.

If $c_{min}<1$ after step 440, the bandwidth requests remain unsatisfied. In step 450, to which is only carried out if $c_{min}$ is less than 1, the congregate node 110 therefore allocates further bandwidth to "unsatisfied" links in the wireless backhaul network 100, while still observing constraints 1 to 5 above. Step 450 will be described in more detail below with reference to FIG. 9. The method 400 then concludes.

Figure 9:
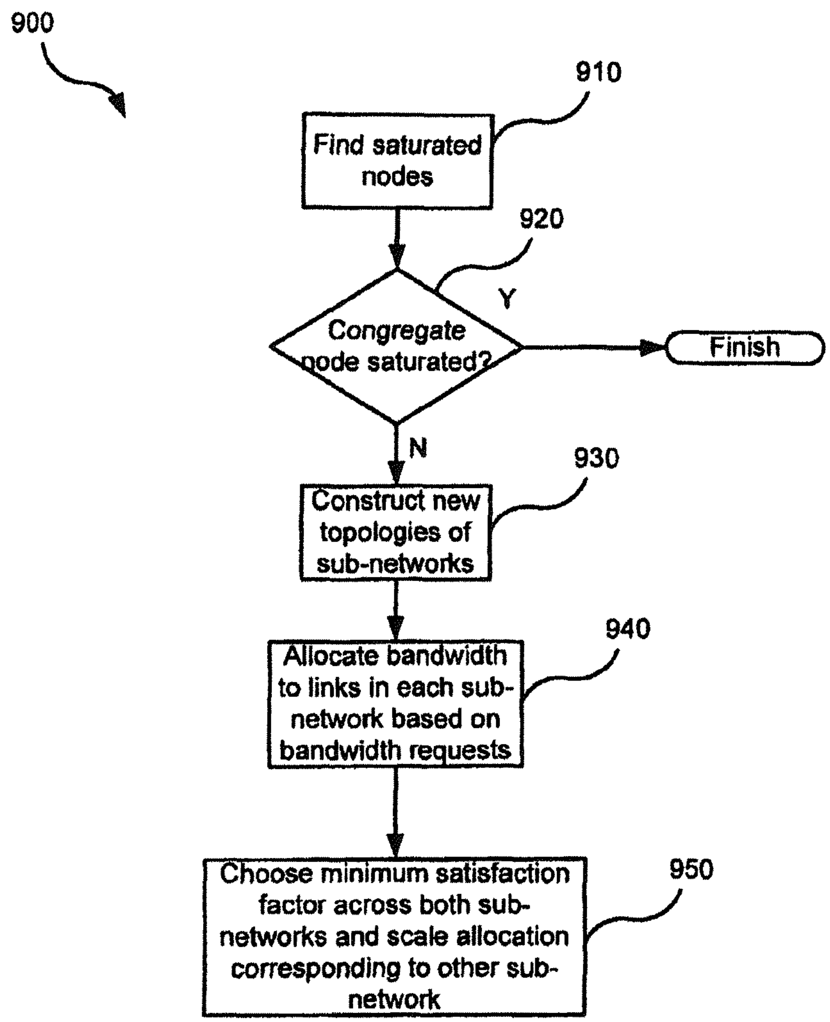
FIG. 9 is a flow chart illustrating a method of allocating further bandwidth to unsatisfied links in a wireless backhaul network, as used in the method of FIG. 4.

FIG. 9 is a flow chart illustrating a method 900 of allocating further bandwidth to unsatisfied links in a wireless backhaul network, as used in step 450 of the method 400. The method 900 starts at step 910, where the congregate node 110 checks all nodes 120-*i* in the backhaul network 100, including itself, to find those nodes whose receiving subbands plus reserved guard bands fill a complete FDD band. Such nodes are "saturated", and it is impossible to allocate more bandwidth to the directional link components terminating at such nodes.

If the congregate node is saturated (tested at step 920), the method 900 concludes, since no more bandwidth can be allocated to any links. Otherwise, the method 900 proceeds to step 930, at which the congregate node 110 constructs new topologies for the two sub-networks by removing the saturated nodes and their subordinate trees. The links connecting the unsaturated nodes to the saturated nodes are maintained as "disconnected links" in the new topologies. In the remaining steps of the method 900, the congregate node 110 allocates bandwidth to the remaining links exclusive of the disconnected links in the new topologies, under the constraint that the subbands allocated to the "disconnected links" should remain unchanged.

To do this, in step 940 the congregate node 110 carries out the method 600, as used previously in step 430, once for each sub-network, with the following alterations:

After the step 630, the allocated subbands of the disconnected links and their reserved intervals on the frequency axis are scaled up by $B_g/B_G$.

The guard band vector g is initialised in step 705 and updated in step 740 only for the non-disconnected links.

The scaled subbands allocated to the disconnected links are taken into account when setting up the reserved bandwidths for the non-disconnected links. For example, the subband allocated in the previous pass through step 730 is overlapping some of the subbands originally allocated to the disconnected links. Then each element corresponding to a link incompatible with any of the disconnected links should indicate that the next subband possibly allocated to the link must be $B_g$ away from the farthest end of the subbands allocated to these disconnected links.

If the width from the end of the subband allocated in the previous pass through step 730 to the fixed subband of a disconnected link is less than $B_g$, in step 710 the compatibility graph $CC_k$ is defined from the compatibility matrix CM without the rows and columns corresponding to the links that arc incompatible with the disconnected link.

After step 940, step 950 follows, at which the congregate node 110 equalises the satisfaction factor across both sub-networks, as previously described with reference to step 440.

Step 450 is carried out iteratively until the congregate node 110 is saturated or no connected links remain in the backhaul network 100.

The foregoing describes only some embodiments of the present invention, and modifications and/or changes can be made thereto without departing from the scope and spirit of the invention, the embodiments being illustrative and not restrictive.

The invention claimed is:

1. A method of dynamically configuring a frequency division duplex wireless backhaul network for a communications system, the network comprising a congregate node connected to the communications system, a plurality of access points, each access point having associated amounts of incident bidirectional traffic to be conveyed to and from the congregate node, and a plurality of bidirectional wireless links adapted to convey the traffic between the access points and the congregate node, the method comprising:

computing a bandwidth request associated with each link from the traffic amounts associated with each node connected by the link;

allocating bandwidth within a first frequency division duplex band of the predetermined available spectrum to each link in a first sub-network of the network based on the computed bandwidth requests associated with those links in the first sub-network; and allocating bandwidth within a second frequency division duplex band of the predetermined available spectrum to each link in a second sub-network of the network based on the computed bandwidth requests associated with those links in the second sub-network; and wherein each of the allocating steps in the first sub-network and the second sub-network respectively comprises:

provisionally allocating bandwidth within the respective first frequency division duplex band and the second frequency division duplex band to each link in the respective first sub-network and the second sub-network based on the bandwidth requests associated with the links and a provisional guard band amount;

computing a scaling factor that, if applied to the provisional bandwidth allocation, would make the total provisionally allocated bandwidth equal to the available bandwidth of the band;

adjusting the provisional guard band amount depending on a comparison between the provisional guard band amount scaled by the computed scaling factor and a lower limit on the guard band amount;

repeating the provisional allocating, computing, and adjusting until the provisional guard band amount scaled by the computed scaling factor converges; and scaling the provisional bandwidth allocation by the computed scaling factor.

2. The method according to claim 1, wherein the allocating is subject to one or more interference constraints on the links.

3. The method according to claim 1, wherein the computing comprises:

computing a bandwidth request for an uplink component of each link based on the uplink traffic amounts; and computing a bandwidth request for a downlink component of each link based on the downlink traffic amounts.

4. The method according to claim 1, wherein the provisional allocation allocates bandwidth in a plurality of subbands within the band.

5. The method according to claim 4, wherein the provisional allocation shares at least one subband among a plurality of compatible links within the sub-network.

6. The method according to claim 4, wherein the provisional allocation allocates to at least one link at least one subband that is reserved as a guard band for a link in the same sub-network that is interfering with the at least one link.

7. The method according to claim 1, further comprising equalising the satisfaction factor across both sub-networks, wherein the satisfaction factor of a link is the ratio of the bandwidth allocated to the link to the bandwidth request associated with the link.

8. The method according to claim 1, further comprising allocating further bandwidth to links for which the satisfaction factor is less than one, wherein the satisfaction factor of a link is the ratio of the bandwidth allocated to the link to the bandwidth request associated with the link.

9. A congregate node in a wireless backhaul network for a communications system, the network comprising a congregate node connected to the communications system, a plurality of access points, each access point having associated amounts of incident bidirectional traffic to be conveyed to and from the congregate node, and a plurality of bidirectional wireless links adapted to convey the traffic between the access points and the congregate node, the congregate node being adapted to perform a method comprising the steps of:

computing a bandwidth request associated with each link from the traffic amounts associated with each node connected by the link;

allocating bandwidth within a first frequency division duplex band of the predetermined available spectrum to each link in a first sub-network of the network based on the computed bandwidth requests associated with those links in the first sub-network; and allocating bandwidth within a second frequency division duplex band of the predetermined available spectrum to each link in a second sub-network of the network based on the computed bandwidth requests associated with those links in the second sub-network; and wherein each of the allocations in the first sub-network and the second sub-network respectively comprises the steps of:

provisionally allocating bandwidth within the respective first frequency division duplex band and the second frequency division duplex band to each link in the respective first sub-network and the second sub-network based on the bandwidth requests associated with the links and a provisional guard band amount;

computing a scaling factor that, if applied to the provisional bandwidth allocation, would make the total provisionally allocated bandwidth equal to the available bandwidth of the band;

adjusting the provisional guard band amount depending on a comparison between the provisional guard band amount scaled by the computed scaling factor and a lower limit on the guard band amount;

repeating the provisional allocating, computing, and adjusting until the provisional guard band amount scaled by the computed scaling factor converges; and scaling the provisional bandwidth allocation by the computed scaling factor.

10. The congregate node according to claim 9, wherein the allocating is subject to one or more interference constraints on the links.

* * * * *